Oct. 20, 1959      P. A. KLANN      2,909,094

ELECTRICALLY CONTROLLED PNEUMATIC VALVE FOR ELECTRIC ORGANS

Filed Dec. 21, 1953

Paul A. Klann
INVENTOR.

BY *Thomas A. O'Brien*
*and Harvey B. Jackson*
Attorneys

United States Patent Office 2,909,094
Patented Oct. 20, 1959

2,909,094

ELECTRICALLY CONTROLLED PNEUMATIC VALVE FOR ELECTRIC ORGANS

Paul A. Klann, Waynesboro, Va.

Application December 21, 1953, Serial No. 399,455

2 Claims. (Cl. 84—339)

This invention relates to electrically controlled organs, and although not specifically limited to a certain type of organ it is particularly related to and specially useful in connection with that type of organ in which pipes are operated by air under pressure the admission of which is controlled electrically. This control is mostly exercised by electromagnets which directly or indirectly control the flow of compressed air through a pipe which is sounded during the playing of the organ.

In organs of this type the size of the openings to be controlled and the forces necessary for the operation of the air control means necessitate a relatively heavy electric equipment and correspondingly they also entail a heavy current consumption. On account of the large number of units which are necessary in connection with an organ this is, of course, a major disadvantage of many constructions.

The invention has for its main object to provide an electrically controlled pneumatic equipment which is completely and safely controllable by electrical units of a very small size and type and of feeble current consumption.

According to the invention the passage of the air under pressure through the pipes which are sounded is controlled by a pneumatically operated pouch valve, normally held in expanded condition when the air pressure in its interior and on the outside is the same. This valve is located in the air chamber or wind chest containing air under pressure and it normally closes the passage of compressed air from the said chamber through a pipe of the organ, as long as the pressures on the outside and on the inside remain equal. The equality of pressure is maintained through the communication of this pneumatic valve with the wind chest or air chamber through an opening controlled by an electromagnetically operated valve which simultaneously also controls the access to a channel or duct arranged in a tubular member which channel or duct leads to the pipe and therefore to the outer air. This dual function valve is directly and electromagnetically controlled inasmuch as it also forms the armature of the controlling magnet. Upon operation of said electromagnet the valve therefore performs the function of closing the communication of the expanded pneumatic valve with the surrounding wind chest or air chamber which contains air under pressure and of opening the communication with the duct leading to the pipe which is under the pressure of the outer air only. The dual operation results in the collapse of the pneumatic pouch valve which was expanded and in the opening of the pipe channel, opened by the collapsed pneumatic pouch valve which permits the compressed air from the air chamber to sound the pipes.

One of the main objects of the invention therefore consists in a simple, self-contained and small size construction for this type of combined electromagnetically controlled pneumatic valve, which construction operates reliably, occupies little space and eliminates the necessity of communications between the chambers under pressure and the outer air other than the pipe channels and which permits nonetheless, fast and complete opening, always to the same extent, of the communication channel between the pipe and the air chamber upon energization and the fast closure of the channel upon de-energization of the electromagnet.

Further objects of the invention are of a more specific character and will be explained in the detailed specification.

The invention is illustrated in the accompanying drawing showing one embodiment thereof. It is however to be understood that the illustration of the invention is not to be considered as limitative inasmuch as the preferred embodiment shown in the drawing intends mainly to illustrate the principle of the invention and the best mode of applying this principle. The embodiment shown is however not the sole method of applying the principle of the invention and a departure from the construction as illustrated is therefore not necessarily a departure from the principle of the invention.

Figure 2:
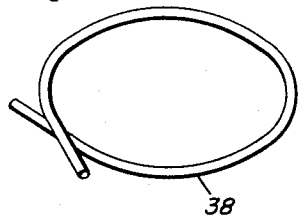
Figure 2 is a perspective view of a retainer spring.
Figure 1:
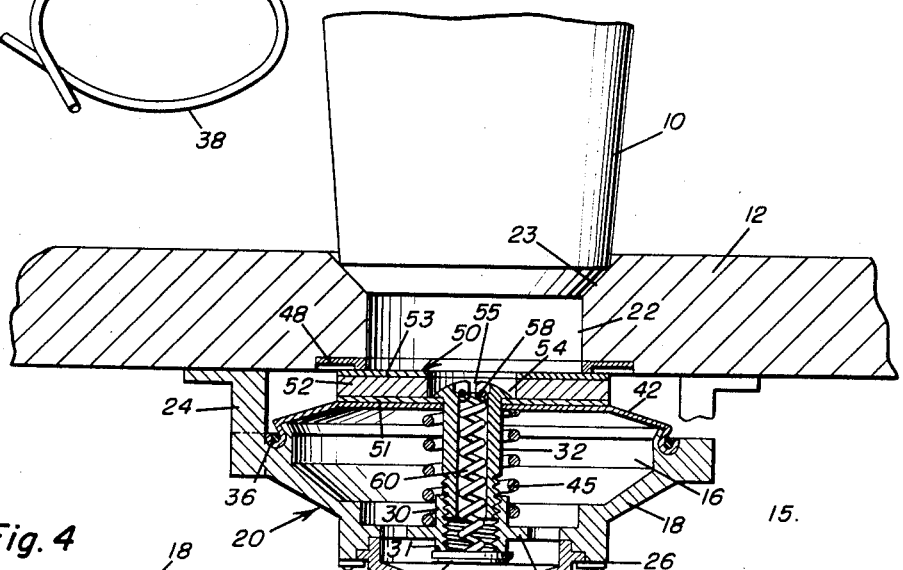
Figure 1 is an elevational sectional view through the pneumatic pouch valve and the adjacent parts also showing the electromagnet control of the said valve.

The invention is more specifically illustrated, as already stated above, in connection with an electric organ of a type in which the admission of air through a pipe 10 is electromagnetically controlled, such electromagnetic control being however exercised indirectly by controlling a pneumatic pouch valve which controls the access to the pipe. The drawing therefore shows a top board 12 which covers the action box or wind chest 15 filled with compressed air which, upon opening of a valve, may flow through the channel 22 provided in said board to the said pipe. The control of the channel 22 and of the pipe 10 is obtained by a valve unit which is generally indicated in the drawing at 20. This valve unit consists of a valve chamber 16 which is surrounded by the valve chamber body 18. The valve chamber body is somewhat spaced from the top board 12 but is attached to the said board by means of feet 24.

Figure 4:
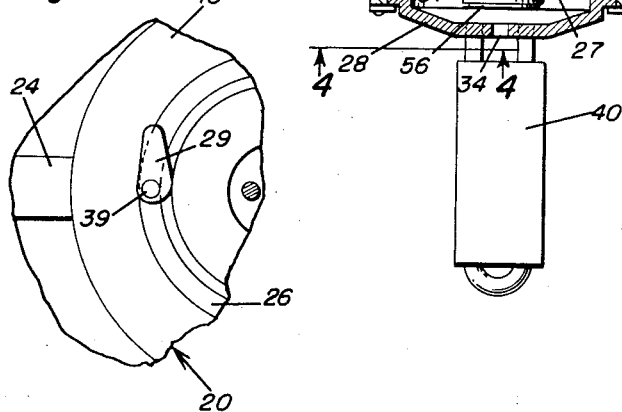
Figure 4 is a plan view of a detail.
Figure 3:
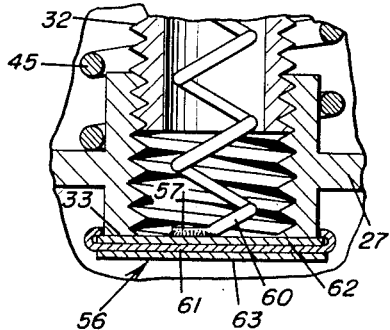
Figure 3 illustrates in elevational section and on an enlarged scale the end of the hollow valve stem and the valve forming the electromagnetic armature controlling the access of air through the stem.

This valve chamber has substantially the shape of a flattened cone the basis of which is turned towards the top board and which is so centered that the axis of the chamber is coincident with the axis of the channel 22. The said channel may have a conical outlet 23 for seating the end of the pipe, the axis of which is therefore also coaxial with the flattened conical air chamber body. On the flat end of the air chamber body a spider or a wall with large openings or perforations 27 is provided supporting an internally threaded sleeve 30 the outer edge of which serves as a valve seat 33. This end is surrounded by a collar-like sleeve 26 which projects from the spider or perforated wall 27 and on which a cap 28 is fastened by means of tongue-shaped clips 29 eccentrically mounted on pins 39, which when rotated into the position shown in Figure 4 hold the flange of the cap and when rotated outwardly through more than 90° will clear the flange so that the cap may be removed. The cap 28 is provided with an opening 34 which forms the sole opening by means of which the air valve chamber 16 communicates with the wind chest 15 filled with compressed air.

The internal threads of the central sleeve 30 engage external threads of a hollow cylindrical tubular member 32, the construction and function of which is described below.

The cap 28 has a flat portion parallel to the end 33 of the sleeve 30, which surrounds the opening 34, and in or near this portion the controlling electromagnet 40 is fastened, the poles of which may be inserted into the cap and may be flush with its inner surface. The cap is preferably made of brass, plastic, or some other non-ferro-magnetic material.

The electromagnet may be of the customary horseshoe or U-type, the legs of which are secured in the cap carrying the coils.

The base portion of the conical valve chamber body 18 is provided with an annular groove 36 of approximately circular cross-section with a narrow entrance into which the circular marginal portion of a leather pouch 42 is inserted. This marginal portion is preferably held within the said groove 36 by a retainer spring 38, made of steel, and so bent that when expanded it will fit into the groove 36 under considerable tension. The spring 38 is shown in Figure 2 in its tensioned state and when it is removed from the groove, the ends of the spring which overlap, serve as handles.

It will be clear that when the spring 38 is inserted and holds the marginal portion of the pouch 42 the latter is firmly secured in the base portion of the chamber.

The leather pouch 42 supports the valve indicated at 50 which closes the channel 22 and which consists preferably of a disk 52 of felt, wood, cork, paper, cardboard, leather or of a similar material, which disk is covered by a leather disk 53 on the side on which the valve is seated. On the other side the valve disk is preferably glued to a disk of leather, cardboard or plastic 51 which in its turn is glued to the pouch 42 so that the valve 50 is firmly attached to the said leather pouch 42.

The valve 50 may be directly seated on the board 12 or a special seat 48, as indicated in the drawing, may be provided in the board in order to seat the valve.

The valve has a central circular opening 54 which, however, preferably does not go through all the portions of the valve; the opening in the disk 51 is somewhat smaller than the opening in the other disks so that the disk 51 projects inwardly.

To keep the valve 50 applied against its seat in which position it closes the channel 22, a spring 45 is provided which is applied against the pouch on one side and against the spider or perforated wall 27 on the other side and which keeps the pouch extended so that the valve 50 is applied against its seat under a certain pressure.

On the somewhat projecting annular portion of the disk 51 the head of the hollow tubular member 32 is seated, which tubular member, as above described has a threaded portion which is threaded into the sleeve 30. The head of the hollow tubular member 32 may be provided with a slot 55 in order to permit the screwing into or the adjustment within the said sleeve 30.

The hollow central portion of the tubular member 32 forms a channel of communication between the pipe channel 22 and the valve chamber 16. Within this channel a fine coil spring 60 is mounted which is soldered or otherwise permanently fixed at the top of the tubular member (as indicated at 58) on one end and which is fixedly connected to a disk valve 56 which is seated on the valve seat 33 on the end of sleeve 30. The spring 60 may either be soldered to the disk valve or may be inserted through a very small hole and bent. The disk valve 56 is a composite disk the central portion of which is made of ferromagnetic material and forms the armature of the magnet. This portion may consist of a thin steel disk 61 the marginal portion of which is bent or rolled over and grips a thin disk 62 of cardboard, plastic, leather or the like which covers the inner surface of the disk valve 56 and which is applied against the seat 33.

On the outer side the armature disk 61 is preferably covered with a leather, cardboard or similar disk 63 which is glued to it and which may in addition be held by the flattened end of the spring when the latter is inserted into a small hole of the armature disk 61 from which said end may slightly project.

It will thus be seen that the armature disk 61, when attracted by the electromagnet, will not touch the poles and become attached to them. The same result may also be obtained by surrounding the poles by a leather or cardboard ring which is slightly thicker than the projecting ends of the poles.

The armature disk which forms part of the disk valve 56 can only be moved towards the magnet by further tensioning the small spring 60 and it will therefore be clear that upon energization of the electromagnet the valve will open the passage through the hollow valve stem when attracted by the magnet, but remains under increased spring tension so that it will return upon de-energization of the magnet.

When the pipe is silent the pressure on both sides of the leather pouch 42 will be equal, as both sides of the pouch are exposed to the compressed air within the wind chest 15. The valve 50 and the valve 56 are therefore both closed, the valve 50 being urged against its seat closing the channel 22 by the spring 45 pressing on the pouch and the valve 56 being drawn toward its seat by the tension spring 60.

When during the playing of the organ the magnet coils of the magnet 40 are energized, the valve 56, by virtue of the armature disk 61 which forms part of it is attracted and closes the opening 34 forming the communication between the wind chest 15 and the valve chamber 16, while simultaneously the compressed air within the wind chest is allowed to escape through the channel formed by tubular member 32, the channel 22 and the pipe 10. The air pressure on the outside, being much smaller than the pressure in the wind chest 15 penetrates into the interior of the pouch which now collapses, overcoming the tension of spring 45 and therefore the valve 50 is opened and the pipe speaks.

Figure 5:
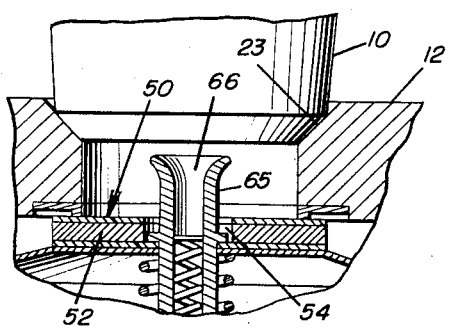
Figure 5 is a fragmentary elevational sectional view of a modified pouch valve.

In order to accelerate the operation of the pouch valve a modified construction of the tubular member shown in Figure 5 may be used. The hollow member 32 in this case is provided with an extension 65 which at its upper end is provided with an outwardly turned lip 66. This extension projects into the channel leading from valve 50 to the pipe 10, but ends below the pipe.

When the valve 50 starts to open compressed air rushes past the extension 65 and lip 66 and exercises a suction which leads to a reduction of the pressure within the pouch which therefore collapses completely and rapidly thus leading to an acceleration of the time of opening of the valve 50.

As seen, the unit is small and self-contained and can therefore be manufactured at low cost. Moving parts are very light and thus respond easily. Moreover, the forces necessary to move the members electromagnetically are very small while the forces moving the larger members are relatively large on account of the fact that they are dependent on the pressure difference, and the surface exposed to the pressure difference is relatively large. The unit cannot get out of order, nor can the spring be lost or displaced. To clean the passage the valve disk is drawn out.

The exhaust through the pipe eliminates the necessity for a separate exhaust opening which must be provided in other constructions.

The action is very fast as the extent of the trip of the moving parts is of minimum length.

A feature of importance is moreover the fixation of the leather pouch which is the sole element that has to be replaced from time to time, by means of a retainer spring which can radially expand. Likewise the fixation of the valve, closing the hollow valve stem, on its spring and the fixation of the latter on the stem itself produces a complete self-contained unit consisting of several parts which are movable relative to each other but are held together in their correct position, none of the parts being loose.

The unit may also be used in connection with different pipe constructons and it will be clear that unessential changes may be made without in any way departing from the essence of the invention as defined in the annexed claims.

What is claimed as new is as follows:

1. In an electric pipe organ with pipes sounded by compressed air, having a wind chest for storing the compressed air, said wind chest having at least one pipe channel communicating the wind chest with a pipe, said pipe channel surrounded by a valve seat, an electromagnetically controlled action mechanism controlling the admission of air to the pipe channel, comprising a casing and a collapsible pouch valve enclosing a substantially closed valve chamber arranged adjacent to each pipe channel on the top of the wind chest, said collapsible pouch valve facing the pipe channel and including a pliable member fixed on the casing and a central valve member, adapted to cooperate with a seat around the pipe channel, provided with a central opening and with central sealing and seating means projecting into said opening, a central tubular member fixedly supported by the said casing projecting from the latter towards the pipe channel and coaxial therewith, said tubular member having spaced valve seats, one seat on each of its ends, the seat at the end facing the pipe channel cooperating with the central sealing and seating means of the central valve member of the pouch valve while the valve seat on the other side is formed by the end face of the said tubular member facing the wind chest, a pouch valve spring supported on the said casing, surrounding said tubular member and applied against the central valve member of the pouch valve, the casing being provided with an opening leading to the wind chest, said opening facing the end face of the tubular member, an electromagnetically operated valve disk and a lightly tensioned spring attached to the valve disk on one end and attached in the interior of the tubular member near the end of the same facing the pipe channel, the spring being only tensioned to the extent necessary to counteract the gravity acting on the electromagnetically operated valve disk, an electromagnet operating the electromagnetically operated disk, said disk thus closing alternatively the opening leading to the wind chest and the end of the tubular member respectively for controlling the pouch valve inflation, the said pouch valve being thus solely operated by the air pressure in the chamber closed by it.

2. In an electric pipe organ an electromagnetically controlled valve action mechanism as claimed in claim 1 wherein the closed valve chamber is provided with a central sleeve member surrounding the axis of said chamber and supported by the chamber walls, said sleeve member forming a section of the tubular member and holding a further tube section coaxially and in alignment, the sleeve being provided with one of the valve seats and the further section of the tubular member being provided with the other valve seat, a removable cap for said closed valve chamber forming a part of its wall removably attachable in front of the valve seat on the sleeve to provide access to said valve seat and to said tubular member and to its channel when removed, said cap containing the channel leading from the closed valve chamber to the wind chest.

References Cited in the file of this patent

UNITED STATES PATENTS

| | | |
|---|---|---|
| 396,899 | Speake | Jan. 29, 1889 |
| 1,665,868 | Waters | Apr. 10, 1928 |
| 1,817,941 | Rockwell | Aug. 11, 1931 |
| 2,140,802 | Lehman | Dec. 20, 1938 |
| 2,278,004 | Thompson | Mar. 31, 1942 |
| 2,562,315 | Kempton | July 31, 1951 |
| 2,638,107 | Teague | May 12, 1953 |

FOREIGN PATENTS

| | | |
|---|---|---|
| 324,167 | Germany | Aug. 20, 1920 |